(12) United States Patent
Li et al.

(10) Patent No.: US 8,576,273 B2
(45) Date of Patent: Nov. 5, 2013

(54) MULTIPOINT CONTROL UNIT CASCADED SYSTEM, COMMUNICATIONS METHOD AND DEVICE

(75) Inventors: Dong Li, Shenzhen (CN); Enkui Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 318 days.

(21) Appl. No.: 12/973,173

(22) Filed: Dec. 20, 2010

(65) Prior Publication Data

US 2011/0085019 A1    Apr. 14, 2011

Related U.S. Application Data

(63) Continuation of application No. PCT/CN2009/072301, filed on Jun. 16, 2009.

(30) Foreign Application Priority Data

Jun. 20, 2008 (CN) .......................... 2008 1 0067960

(51) Int. Cl.
*H04N 7/14* (2006.01)
(52) U.S. Cl.
USPC .............................................. 348/14.09
(58) Field of Classification Search
USPC .............................................. 348/14.09
See application file for complete search history.

(56) References Cited

U.S. PATENT DOCUMENTS 5,737,010 A * 4/1998 Yachi et al. ................. 348/14.09
7,185,054 B1 * 2/2007 Ludwig et al. ............... 709/204
7,683,923 B2 * 3/2010 Zhang et al. ................. 348/14.01
8,209,418 B2 * 6/2012 Xu .................................. 709/227
2007/0011313 A1    1/2007 Xu

FOREIGN PATENT DOCUMENTS

| CA | 2615459 A1 | 1/2007 |
|---|---|---|
| CN | 1642263 A | 7/2005 |
| CN | 1885785 A | 12/2006 |
| CN | 2615459 | 1/2007 |
| CN | 101316351 A | 12/2008 |
| WO | WO-2007/075196 A1 | 7/2007 |

OTHER PUBLICATIONS

Written Opinion of the International Searching Authority (translation) dated (mailed) Sep. 10, 2009, issued in related Application No. PCT/CN2009/072301, filed Jun. 16, 2009 Shenzhen Huawei Communication Technologies Co., Ltd. (5 pgs.).

(Continued)

*Primary Examiner* — Duc Nguyen
*Assistant Examiner* — Theodore Ndje
(74) *Attorney, Agent, or Firm* — Slater & Matsil, L.L.P.

(57) ABSTRACT

A Multipoint Control Unit (MCU) cascaded system is provided, which includes a plurality of MCUs under the management of a service management center. The cascade manner between the MCUs in the system is a reticulated cascade. A communications method for an MCU cascaded system, an MCU, and a service management center are also provided. In the embodiments of the present invention, because the connection and networking mode of MCUs in a cascaded system is changed, a transmission path passing the least MCUs can be selected according to a connection situation between the MCUs. Therefore, transmission delay and decrease of video and audio quality due to multiple forwarding by MCUs can be effectively avoided, and thus the media stream transmission time is reduced, and the play quality of the media stream is guaranteed in an overall manner.

16 Claims, 6 Drawing Sheets

(56) References Cited

OTHER PUBLICATIONS

Deville, et al., "Interoperability Issues of Existing Collateral Video Teleconferencing System at the United Pacific Command"; Military Communications Conference, MILCOM'94., Conference Record, 1994 IEEE Fort Monmouth, NJ, Oct. 2-5, 1994, 0-78003-1828-5/94 IEEE, (5 pgs.)—Missing 2-3 pgs.
Extended European Search Report dated (mailed) Jun. 6, 2011, issued in related Application No. 09765401.6-1241/2306714, PCT/CN2009072301, filed May 23, 2008, Huawei Technologies Co., Ltd.
Sullivan, "A Primer on the T.120 Standard", ITU-TS SG15, Working Party 15/1, Expert's Group for Very Low Bitrate Visual Telephony, Shepperton, UK, Jul. 15-18, 1996 (13 pgs.).

"ITU-T H243 Series H: Audiovisual and Multimedia Systems Infrastructure of audiovisual services—Communication procedures, Procedures for establishing communication between three or more audiovisual terminals using digital channels up to 1920 kbit/s" Jul. 1997.
"ITU-T H.245 Series H: Audiovisual and Multimedia Systems Infrastructure of audiovisual services—Communication procedures, Control protocol for multimedia communication" Feb. 1998.
ITU-T H323 Series H: Audiovisual and Multimedia Systems Infrastructure of audiovisual services—Systems and terminal equipment for audiovisual services, Packet-based multimedia communications systems, Feb. 1998.
International Search Report for International Application No. PCT/CN2009/072301, mailed Sep. 10, 2009 Huawei Technologies Co., LTD.

\* cited by examiner

MULTIPOINT CONTROL UNIT CASCADED SYSTEM, COMMUNICATIONS METHOD AND DEVICE

CROSS-REFERENCE TO RELATED APPLICATIONS

This application is a continuation of International Application No. PCT/CN2009/072301, filed on Jun. 16, 2009, which claims priority to Chinese Patent Application No. 200810067960.4, filed on Jun. 20, 2008, both of which are hereby incorporated by reference in their entireties.

FIELD OF THE TECHNOLOGY

The present invention relates to the field of communications, and more particularly to a Multipoint Control Unit (MCU) cascaded system, a communications method, an MCU, and a service management center.

BACKGROUND OF THE INVENTION

Figure 1:
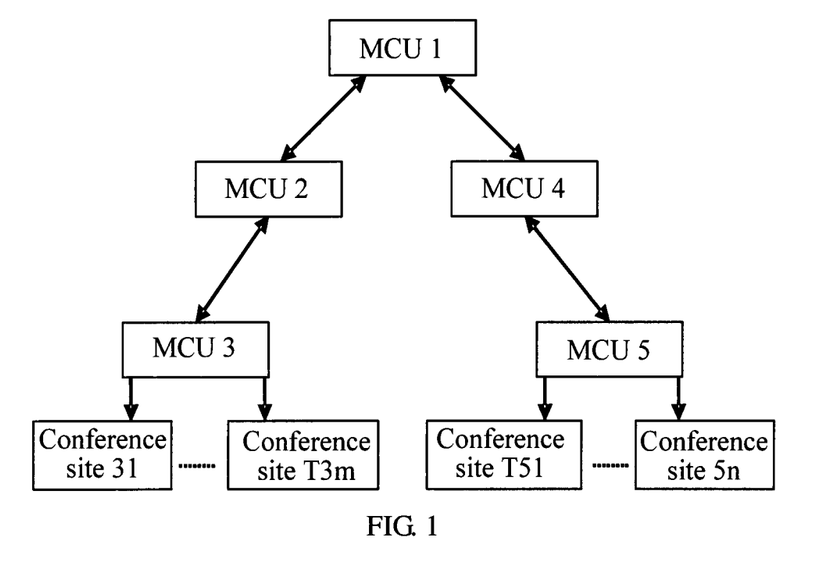
FIG. 1 is a schematic view of networking of an MCU cascaded system in the conventional art.

With the ever developing of modern network technology and broadband construction, a videoconference system has been extensively applied to areas of work and life. In a television conferencing application, MCUs can be cascaded to one another. In a cascade conference, terminal conference sites under different MCUs can be scheduled in the same conference, that is, the networking in a cascade manner shown in FIG. 1 exists. An MCU2 and an MCU4 are hung under an MCU1. An MCU3 is hung under the MCU2, and an MCU5 is hung under the MCU4. Conference sites from T31 to T3$m$ are the conference sites hung under the MCU3, and conference sites from T51 to T5$n$ are the conference sites hung under the MCU5 (both m and n are integers greater than 1). When the video conferencing system shown in FIG. 1 is used to hold a cascade MCU conference, because many MCU cascade levels (more than two levels of MCUs) exist, media stream delay due to the MCU cascade and loss resulting from multiple encoding and decoding seriously affect video and audio effect. For example, as shown in FIG. 1, the conference site T51 hung under the MCU5 receives a media stream from the T31 under the MCU3. Because multiple forwarding by MCUs is performed during the process (MCU3->MCU2->MCU1->MCU4->MCU5), the transfer path is long. Therefore, when the conference site T51 receives the data from the conference site T31, the video and audio is delayed for a long time. At the same time with audio mixing of all levels of MCUs and multiple times of encoding, video and audio quality is also greatly lowered.

In the conventional art, some solutions as follows are used to improve the lines between cascaded MCUs. For example, improvement of lines, such as the changing of the materials of lines between MCUs is implemented to achieve the objective of alleviating delay of a media stream and a decline in video and audio quality due to transmission. However, the improvement of the transmission lines is of high input costs, and is not easy to be implemented. As for the effect of improvement, delay caused by multiple forwarding by MCUs cannot be handled, and therefore this solution is not effective on solving the overall delay.

SUMMARY OF THE INVENTION

The present invention is directed to an MCU cascaded system, a communications method, an MCU, and a service management center, so as to solve the problem of delay of a media stream and a decline in video and audio quality caused by transmission.

According to the above objective, the technical solutions according to embodiments of the present invention are implemented as follows.

In an embodiment, the present invention provides an MCU cascaded system, which includes a plurality of MCUs under the management of a service management center. The cascade between the MCUs in the system is a reticulated cascade.

The MCU is configured to receive information of a conference sent by the service management center.

The MCU is further configured to, according to the information of the conference, schedule the conference, establish link list information about all MCUs that are to attend the conference, and call other MCUs that are to attend the conference to join the conference.

The MCU is further configured to synchronize and obtain conference site information of the conference according to the link list information.

The MCU is further configured to select, according to the conference site information of the conference, a path to send video and audio data.

In an embodiment, the present invention further provides a communications method for an MCU cascaded system. The cascade between MCUs in the system is a reticulated cascade, and the method includes the following steps.

Information of a conference sent by a service management center is received.

According to the information of the conference, the conference is scheduled, link list information about all MCUs that are to attend the conference is established, and other MCUs that are to attend the conference are called to join the conference.

Conference site information of the conference is obtained after synchronizing according to the link list information.

A path is selected according to the conference site information to send video and audio data.

In an embodiment, the present invention further provides an MCU. The MCU is located in an MCU cascaded system, and includes an establishment unit, a synchronization unit, and a sending unit. The cascade between MCUs in the system is a reticulated cascade.

The establishment unit is configured to, according to information of the conference sent by a service management center, schedule the conference, establish link list information about all MCUs that are to attend the conference, and call other MCUs that are to attend the conference to join the conference.

The synchronization unit is configured to synchronize and obtain conference site information of the conference according to the link list information.

The sending unit is configured to select a path to send video and audio data according to the conference site information of the conference.

In an embodiment, the present invention further provides a service management center. The service management center is located in an MCU cascaded system.

In view of the above solutions, compared with the conventional art, in the embodiments of the present invention, the manner of connection and networking among MCUs in a cascaded system is changed to a reticulated cascade structure, which is easier to be implemented and is of lower costs compared with the solutions in the conventional art. Furthermore, with the manner after change for networking, each MCU can be cascade-connected with other MCUs, so that when a video and audio media stream is transferred between different MCUs, a transmission path passing the least MCUs can be selected according to a connection situation between the MCUs. Therefore, transmission delay and a decline in video and audio quality caused by multiple forwarding by MCUs can be effectively avoided, and thus transmission time of a media stream is reduced, and the play quality of the media stream is guaranteed in an overall manner.

DETAILED DESCRIPTION OF THE EMBODIMENTS

In order to make the objectives, technical solutions, and advantages of the present invention more comprehensible, embodiments of the present invention are described in further detail below with reference to the accompanying drawings.

Figure 2:
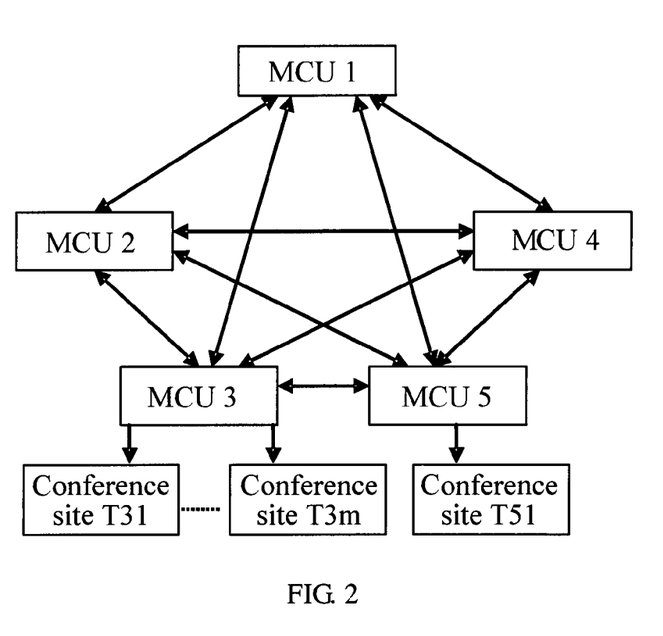
FIG. 2 is a schematic view of networking of an MCU cascaded system according to an embodiment of the present invention.

In an embodiment, the present invention provides an MCU cascaded system, which, as shown in FIG. 2, includes a plurality of MCUs and a service management center (not shown in the Figure) managing the plurality of MCUs. A cascade manner between the MCUs is a reticulated cascade. A two-way cascade channel exists between every two MCUs in the system. That is to say, an MCU1, MCU2, MCU3, MCU4, and MCU5 are connected to one another. Conference sites from T31 to T3$m$ are hung under the MCU3 (m is an integer greater than 1). A conference site of T51 is hung under the MCU5.

The service management center in the system is a functional entity that manages the MCUs, and can be operated by a user to manage one or more MCUs, set attribute features of the MCUs, and control the MCUs to schedule a conference. The service management center determines information of a conference, which includes an MCU cascade situation of the conference. The MCU cascade situation includes information of all MCUs that are to attend the conference and whether the networking mode is a reticulated cascade. The information of all of the MCUs that are to attend the conference includes all of the MCUs that are to attend the conference. The information of all of the MCUs that are to attend the conference further includes numbers of all of the MCUs that are to attend the conference. The MCU cascade situation of the conference further includes a superior-subordinate relationship between an MCU and MCUs connected to the MCU, and a connection relationship between the MCU and other MCUs that are to attend the conference. For example, in this embodiment, before the MCUs schedule the conference, the service management center is required to determine the networking manner of each of the MCUs, that is, whether the reticulated cascade is used; designate all of the MCUs that are to attend the conference; allocate a number (an M number) to each of the MCUs; and at the same time is required to designate the superior-subordinate relationship between each two connected MCUs, and the connection relationship between the MCU and other MCUs that are to attend the conference. The service management center allocates the M number to each of the MCUs and the superior-subordinate relationship between the MCUs, so that it is guaranteed that no conflict of M numbers occurs during MCU cascade negotiation.

It can be understood that, the service management center may also only determine whether the networking mode of the MCU in the cascaded system is a reticulated cascade, and all of the MCUs that are to attend the conference. Other information is determined through negotiation by the MCUs that are to attend the conference in the system, for example, the numbers of all of the MCUs that are to attend the conference, the superior-subordinate relationship between the MCU and the MCUs connected to the MCU, and the connection relationship between the MCU and the other MCUs that are to attend the conference. The connection relationship means whether the MCU is directly connected to the other MCUs that are to attend the conference.

Upon the completion of the above relationship allocation, specific processing of MCU conference under the system is performed. The service management center is configured to send information of the conference to each of the MCUs that are to attend the conference in the system. The cascade between the MCUs in the system is the reticulated cascade. The information of the conference includes the MCU cascade situation of the present cascade conference.

The MCU is configured to, according to the information of the conference, schedule the conference, obtain the MCU cascade situation of the present cascade conference, establish link list information about all of the MCUs that are to attend the conference, establish one or more cascade ports on the MCU, and call the one or more cascade ports to join the conference. When the one or more cascade ports are called to join the conference, a master and a slavery MCU are required to be determined according to the superior-subordinate relationship between the MCUs. In specific implementation, the superior MCU calls the connected subordinate MCU to join the conference. Because the above information of the conference includes the MCU cascade situation of the present cascade conference, the link list information about each of the MCUs is established according to the obtained MCU cascade situation of the present cascade conference. The link list information about the present MCU includes: the numbers of other MCUs in the system that are to attend the conference and a list of the conference sites hung under the other MCUs, and connection paths and distances between the other MCUs and the present MCU.

The MCU is further configured to synchronize conference site information of the MCU cascaded system according to the link list information of the MCU, which specifically includes the following steps. The MCU selects, according to the link list information of the MCU, MCUs connected to the MCU, sends the conference site information of the MCU to the MCUs connected to the MCU, and requests the MCUs connected to the MCU for the conference site information of the MCUs connected to the MCU. After the MCU receives the conference site information of the MCUs connected to the MCU, the MCU combines the received conference site information and the conference site information of the MCU to form the conference site information of the conference.

The MCU is further configured to select, according to synchronized conference site information, a path to send video and audio data. Specifically, an optimal path may be selected. The optimal path may be a synthesis result of one or more kinds of the following information: the shortest path, a path with the highest network quality, and a path with the highest network security, selected by the MCU according to the synchronized conference site information, for transferring the video and audio data. The video and audio data can be forwarded from different cascade ports of the MCU according to the above-mentioned requirements.

In view of the above, by adoption of the MCU cascaded system according to the embodiment of the present invention, the reticulated cascade networking method is used, each of the MCUs can be cascaded with other MCUs, so that when a video and audio media stream is transmitted between different MCUs, a transmission path passing the least MCUs can be selected according to the connection situation between the MCUs. Therefore, delay caused by the forwarding and the transmission of the media stream is decreased, and at the same time, the number of the times of encoding and decoding of the media stream in each of the MCUs is decreased and quality loss of the video and audio is reduced greatly. At the same time, this system can be implemented by upgrading software in existing MCU equipment without modifying the lines, thus having better overall extensibility, and becoming easier to implement.

Figure 3:
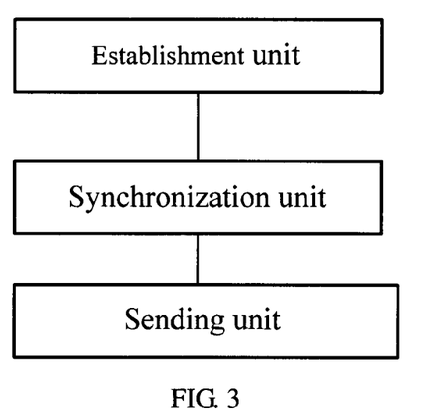
FIG. 3 is a schematic structural view of an MCU according to an embodiment of the present invention.

In an embodiment, the present invention further provides an MCU. The MCU, as shown in FIG. 3, is located in an MCU cascaded system, and includes an establishment unit, a synchronization unit, and a sending unit. A cascade manner between MCUs in the system is a reticulated cascade. The establishment unit is configured to, according to information of a conference sent by a service management center, schedule the conference, establish link list information about all MCUs that are to attend the conference, and call other MCUs that are to attend the conference to join the conference. The synchronization unit is configured to synchronize and obtain conference site information of the conference according to the link list information. The sending unit is configured to select, according to the conference site information of the conference, a path to send video and audio data.

When the service management center determines an MCU cascade situation of the present cascade conference, where the MCU cascade situation includes whether the networking mode is a reticulated cascade and all MCUs that are to attend the conference, an MCU may also negotiate with MCUs connected to the MCU to determine one or more kinds of the following information: numbers of all of the MCUs that are to attend the conference, a superior-subordinate relationship between the MCU and the MCUs connected to the MCU, and a connection relationship between the MCU and other MCUs that are to attend the conference. The connection relationship means whether the MCU is directly connected to the other MCUs that are to attend the conference.

When the service management center determines all of the above-mentioned MCU cascade situations of the present cascade conference, the MCUs, which are under the management of the service management center and to attend the conference, are only required to store the MCU cascade situations of the present cascade conference.

Specifically, the step the establishment unit, according to the information of the conference sent by the service management center, schedules the conference, establishes the link list information about all of the MCUs that are to attend the conference, and calls other MCUs that are to attend the conference to join the conference is specified as follows: the establishment unit, according to the information of the conference, obtains the MCU cascade situation of the present cascade conference, and establishes the link list information about all of the MCUs in the conference. The link list information includes the numbers of the other MCUs that are to attend the conference, a list of conference sites hung under the MCU, and link paths and distances between the other MCUs and the MCU.

The synchronizing and obtaining of the conference site information of the conference according to the link list information by the synchronization unit more specifically includes the following steps. MCUs connected to an MCU are selected according to the link list information of the MCU. The conference site information of the MCU is sent to the MCUs connected to the MCU. The MCUs connected to the MCU are requested for the conference site information of the MCUs. After receiving the conference site information of the MCUs connected to the MCU, the MCU combines the received conference site information and the conference site information of the MCU to form the conference site information of the conference.

The MCU selects, according to the synchronized conference site information, an optimal path to send the video and audio data. The selection of the optimal path may be a synthesis result of one or more kinds of information as follows: the shortest path, an optimal path with the highest network quality, and a path with the highest network security selected, by the MCU according to the synchronized conference site information, for transferring the video and audio data. The video and audio data can be forwarded from different cascade ports of the MCU according to the above-mentioned requirements.

In view of the above, by adoption of the MCU according to the embodiment of the present invention, the system where the MCU belongs uses the reticulated cascade for networking, each of the MCUs can be cascaded with the other MCUs, so that, when a video and audio media stream is transmitted between different MCUs, a transmission path passing the least MCUs can be selected according to the connection situations between the MCUs. Therefore, delay caused by the forwarding and the transmission of the media stream is decreased, and at the same time, the number of the times of encoding and decoding of the media stream in each of the MCUs is decreased, and quality loss of the video and audio is reduced greatly. At the same time, because of the use of the MCU according to the embodiment of the present invention, implementation can be performed by upgrading software in existing MCU equipment without modifying the lines, thus having better overall extensibility, and becoming easier to implement.

In an embodiment, the present invention further provides a service management center, which is located in an MCU cascaded system. A cascade between MCUs in the system is a reticulated cascade. The service management center is configured to send information of a conference to all MCUs that are to attend the conference in the system. The information of the conference includes an MCU cascade situation of the conference. The MCU cascade situation of the conference includes information of all of the MCUs that are to attend the conference and whether the networking mode is a reticulated cascade. The information of all of the MCUs that are to attend the conference includes all of the MCUs that are to attend the conference.

When the service management center determines the MCU cascade situation of the present invention conference, where the MCU cascade situation includes whether the networking mode is a reticulated cascade and all of the MCUs that are to attend the conference, an MCU is further required to negotiate with MCUs connected to the MCU to determine one or more kinds of information as follows: numbers of all of the MCUs that are to attend the conference, a superior-subordinate relationship between the MCU and the MCUs connected to the MCU, and a connection relationship between the MCU and other MCUs that are to attend the conference. The connection relationship means whether the MCU is directly connected to the other MCUs that are to attend the conference.

When the service management center determines all of the above-mentioned MCU cascade situations of the present cascade conference, the MCUs under the management of the service management center and to attend the conference are only required to store the MCU cascade situations of the present cascade conference.

After the above relationship allocation is completed, specific processing of MCU conference under the system is performed.

In view of the above, by adoption of the service management center according to the embodiment of the present invention, the service management center sends the MCU cascade situation of the present cascade conference to the MCUs under the management of the service management center and to attend the conference, and clarifies relevant information of the MCUs that are to attend the conference, so that it is convenient for the holding of subsequent conference and delivery of conference data.

Figure 4:
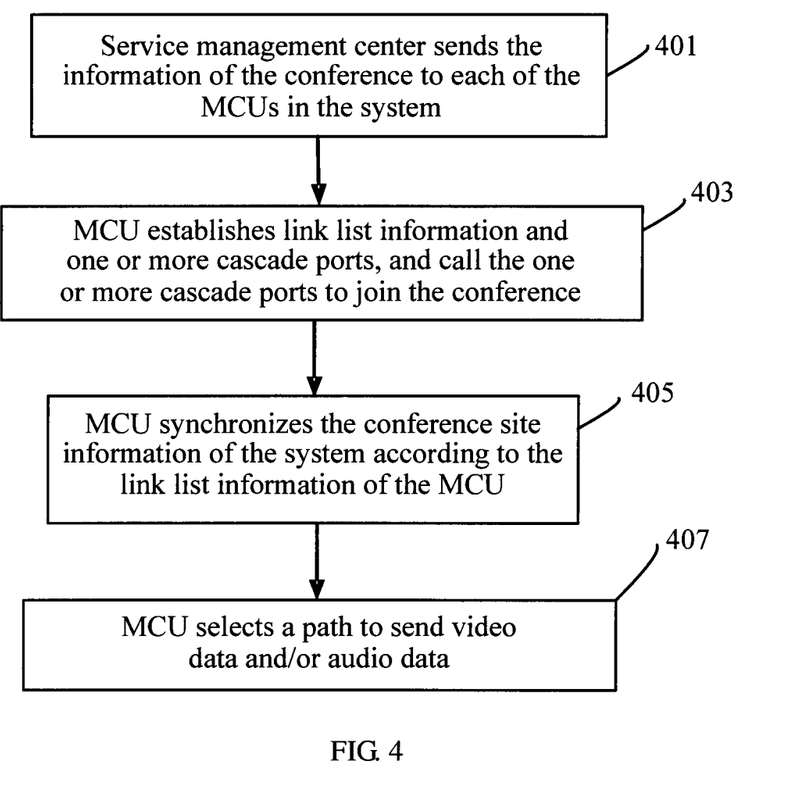
FIG. 4 is a flowchart of a communications method of an MCU cascaded system according to an embodiment of the present invention.

In an embodiment, the present invention further provides a communications method for an MCU cascaded system. As shown in FIG. 4, the method includes the following steps.

At first, in step 401, a service management center determines information of a conference, which includes an MCU cascade situation of the conference. The MCU cascade situation includes information of all MCUs that are to attend the conference and whether the networking mode is a reticulated cascade. The information of all of the MCUs that are to attend the conference includes all of the MCUs that are to attend the conference. The information of all of the MCUs that are to attend the conference further includes numbers of all of the MCUs that are to attend the conference. The MCU cascade situation of the conference further includes a superior-subordinate relationship between an MCU and MCUs connected to the MCU, and a connection relationship between the MCU and other MCUs that are to attend the conference. In this embodiment, after the above information is determined, the service management center sends the information of the conference to each of the MCUs in the system. The cascade manner between the MCUs in the system is a reticulated cascade. Before sending the information of the conference to each of the MCUs in the system, the service management center is further required to determine whether the networking mode of a reticulated cascade is a reticulated cascade, all of the MCUs that are to attend the conference, number of each of the MCUs, the superior-subordinate relationship between an MCU and MCUs connected to the MCU, and the connection relationship between the MCU and other MCUs that are to attend the conference. The information of the conference includes the MCU cascade situation of the present cascade conference.

Further, in step 403, the MCU, according to the information of the conference, schedules the conference, obtains the MCU cascade situation of the present cascade conference, establishes link list information of all of the MCUs that are to attend the conference, establishes one or more cascade ports on the MCU, and calls the one or more cascade ports to join the conference. When the one or more cascade ports are called to join the conference, the master and the slavery MCUs are required to be determined according to the superior-subordinate relationship between the MCUs. In specific implementation, the superior MCU may call the connected subordinate MCU to join the conference. Because the above-mentioned information of the conference includes the MCU cascade situation of the present cascade conference, the link list information of each of the MCUs is established according to the obtained MCU cascade situation of the present cascade conference. The link list information includes: the numbers of the other MCUs that are to attend the conference in the system and a list of the conference sites hung under the other MCUs, and link paths and distances between the other MCUs and the present MCU. The establishment of the link list information specifically includes the followings steps. Each of the MCUs obtains an MCU cascade situation of the present cascade conference and establishes the link list information of each of the MCUs in the cascade conference, according the information of the conference.

Figure 5:
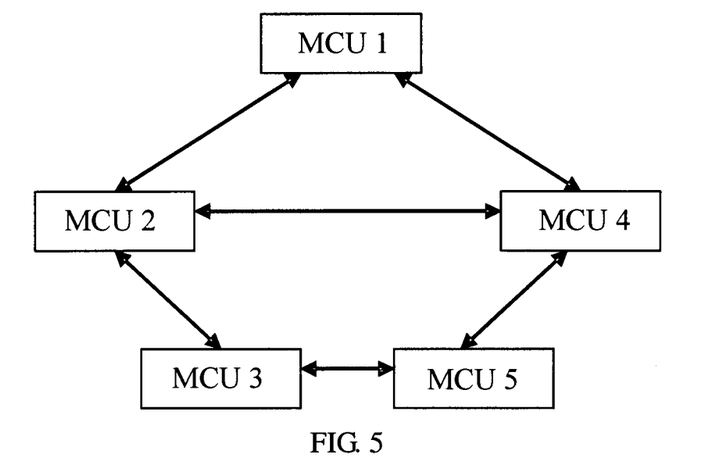
FIG. 5 is a schematic view of networking of an MCU cascaded system according to an embodiment of the present invention.

Concerning the link list information, a schematic view of networking shown in FIG. 5 can be referred to. The MCU cascaded system shown in FIG. 5 belongs to one of MCU networking forms where no cascade channel exists between some MCUs, that is, a networking form where all of the MCUs in the system do not form a fully connected network. An MCU1 is only connected to an MCU2 and an MCU4. The MCU2, besides being connected to the MCU1, is connected to an MCU3 and an MCU4. The MCU3, besides being connected to the MCU2, is further connected to an MCU5. The MCU5, besides being connected to the MCU3, is further connected to the MCU4. According to the connection relationship between the MCUs in the figure, the link list information of the MCU1 shown in Table 1 may be formed.

TABLE 1

| | Link list information of the MCU1 | | |
|---|---|---|---|
| M number | List of conference sites under the MCU | Path to the MCU1 | Distance number to the MCU1 |
| 2 | <2, 1> ... <2, m> | 1->2 | 1 |
| 3 | <3, 1> ... <3, n> | 1->2->3 | 2 |
| 4 | <4, 1> ... <4, x> | 1->4 | 1 |
| 5 | <5, 1> ... <5, y> | 1->4->5 | 2 |

M is the number of each of the MCUs except the MCU1, and m, n, x and y are respectively integers greater than 1. Accordingly, similar cascade link list information of other MCUs is also established. Through the link list information, the relationship between each MCU and the other MCUs in the system is indicated, which therefore prepares for the obtaining of the MCU cascade situation of the whole cascade conference.

In addition, in step 405, the MCU synchronizes conference site information of the MCU cascaded system according to the link list information of the MCU, which specifically includes the following steps. The MCU selects, according to the link list information of the MCU, MCUs connected to the MCU; sends the conference site information of the MCU to the MCUs connected to the MCU; and requests the MCUs connected to the MCU for the conference site information of the MCUs connected to the MCU. After the MCU receives the conference site information of the MCUs connected to the MCU, the MCU combines the received conference site information and the conference site information of the MCU to form the conference site information of the conference.

At last, in step 407, the MCU selects, according to the synchronized conference site information, a path to send video and audio data, where an optimal path may be selected. The selection may be a synthesis result of one or more kinds of information as follows: the shortest path, an optimal path with the highest network quality, and a path with the highest network security selected, by the MCU according to the synchronized conference site information, for transmitting the video and audio data. The video and audio data can be forwarded from different cascade ports of the MCU according to the above-mentioned requirements.

The forwarding of the audio data and the video data is described respectively in the following.

For the forwarding of the audio data, audio mixing is performed by a current MCU on all of the audio data. That is, each of the conference sites sends audio data of the each conference site to the MCU, the MCU performs audio mixing, and then the MCU sends the audio-mixed data to each of the conference sites. However, the sound from a cascade port may be audio-mixed for several times. As shown in FIG. 2, the audio of the MCU1 is respectively sent to the MCU2 and the MCU3, and the mixed audio of the MCU2 is also sent to the MCU3. Because each of the MCUs may forward sound with the maximum volume or the minimum volume, the mixed audio sent by the MCU2 and the mixed audio sent by the MCU1 received at the MCU3 may include the same sound, that is, the sound of the MCU1 exists in both mixed audios, which leads to sound overlapping. Therefore, the audio mixing of the MCU is required to be controlled. That is, the mixed audio data sent by the MCU to the cascade conference sites shall not include the audio data from other cascade ports, and in this way the repeated mixing of sound can be avoided. For example, a mixed audio code stream sent to the MCU2 by the MCU1 does not include the audio from the cascade ports such as the MCU3, MCU4 or MCU5.

The forwarding of the video data is also applicable to the forwarding of the audio data. When the MCU switches video data, the switching method is determined according to a situation of an MCU to which the source conference site and the destination conference site belong. If the two conference sites belong to the same MCU, no special processing is required. If the two conference sites belong to difference MCUs, an optimal path (which may be the shortest path) to transmit the video data is selected according to the currently stored MCU link list information. For example, if the networking method shown in FIG. 5 is used, the link list information shown in Table 1 can be inquired, so as to find the M number of the destination MCU. That is, the path between the current MCU and the destination MCU can be obtained. The switching of the video is controlled by the MCU according to the path.

As shown in FIG. 2, if a conference site T51 needs to see the image of a conference site T31, after receiving the video switching command, the MCU3 searches the MSC link list information and finds that the T31 belongs to the MCU3, the T51 belongs to the MCU5, the shortest path between the MCU3 and the MCU5 is the path from the MCU3 to the MCU5, and therefore it can be determined that the video transmission path is T31->MCU3->MCU5->T51.

According to the principle in the above example, for each video switching request, the line passing the least MCU between a source conference site and a destination conference site can be determined according to the cascade information between the MCUs. Also, switching and transmission of video data can be performed according to the line.

Processing of multi-image video is specifically described in the following. If the networking method shown in FIG. 2 is used, when multiple images are required to be processed, the service management center is required to designate an MCU that synthesizes the multiple images. Assuming in FIG. 2, it is required that the multi-image synthesis is performed at the MCU1. After receiving a processing command of synthesizing multiple images from the service management center, the MCU1 notify other MCUs in the system to set multiple images. The notification can be given by broadcasting. After MCUs, which are not required to synthesize multiple images, receive a notification message, according to conference site distribution of each sub-image, if the conference site of the current MCU belongs to a synthesized sub-image, the MCU is required to send the video data of the corresponding conference site to the MCU that synthesizes the multiple images (that is, the MCU1 in this embodiment). The forwarding of the video data is the same as the foregoing presentation. Assume that the MCU2, MCU3, MCU4, and MCU5 all have a conference site belonging to a synthesized sub-image, they respectively send corresponding video data to the MCU1 through the shortest path. Upon receiving the video data from each of the MCUs, the MCU1 can synthesize a multi-image, and forward the multi-image data to other MCUs. The forwarding is the same as the above-mentioned.

Figure 6:
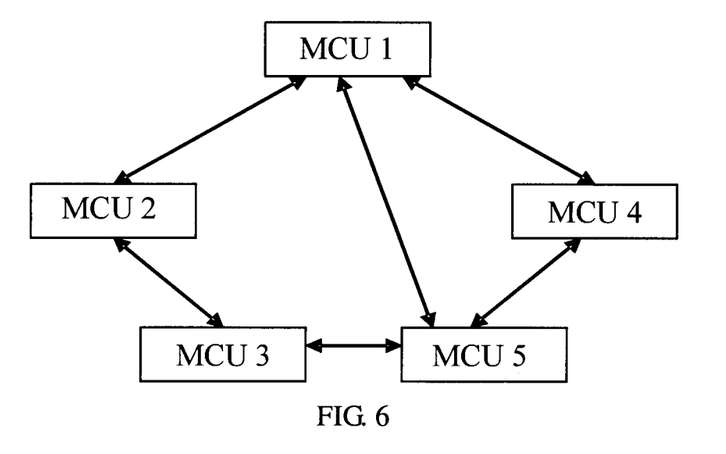
FIG. 6 is a schematic view of networking of an MCU cascaded system according to another embodiment of the present invention.

In an embodiment, the present invention further provides a communications method for an MCU cascaded system. As shown in FIG. 6, what is different from the MCU cascaded system shown in FIG. 5 is that a direct link between the MCU2 and the MCU4 does not exist in the MCU cascaded system in this embodiment, which is replaced with the direct link between the MCU1 and the MCU5. Then, the following link list information of the MCU1 is formed.

TABLE 2

Link list information of the MCU1

| M number | List of conference sites under the MCU | Path to the MCU1 | Distance number to the MCU1 |
| --- | --- | --- | --- |
| 2 | <2, 1> . . . <2, m> | 1->2 | 1 |
| 3 | <3, 1> . . . <3, n> | 1->2->3 | 2 |
| 4 | <4, 1> . . . <4, x> | 1->4 | 1 |
| 5 | <5, 1> . . . <5, y> | 1->5 | 1 |

For the forwarding of audio data, as shown in FIG. 6, in order to avoid repeated audio mixing, the audio mixing of an MCU is required to be controlled. That is, mixed audio data sent by the MCU to a cascade conference site cannot include audio data from other cascade ports. For example, the mixed audio code stream sent by the MCU1 to the MCU5 does not include the audio from the cascade ports of the MCU2 or the MCU4.

The forwarding of the video data is also applicable to the forwarding of the audio data. When the MCU switches video data, the switching method is determined according to a situation of an MCU to which the source conference site and the destination conference site belong. If the two conference sites belong to the same MCU, no special processing is required. If the two conference sites belong to difference MCUs, an optimal path (which may be the shortest path) to transmit the video data is selected according to the currently stored MCU link list information. As shown in FIG. 6, assume that a conference site T1 is hung under the MCU1, and a conference site T5 is hung under the MCU5, if the conference site T5 needs to see the image of the conference site T1, after receiving the video switching command, the MCU5 searches the MCU link list information, and finds that the T1 belongs to the MCU1, the T5 belongs to the MCU5, the shortest path between the MCU1 and the MCU5 is the path from the MCU1 to the MCU5, so that it can be determined that the video transmission path is T1->MCU1->MCU5->T5.

In this embodiment, the processing method of the multi-image video is the same as the processing method of the multi-image video in the above-mentioned embodiment, and is not discussed herein.

In view of the above, by adoption of the communications method for the MCU cascaded system according to the embodiment of the present invention, the reticulated cascade is used for networking in the system, each of the MCUs can be cascaded with the other MCUs, so that when a video and audio media stream is transmitted between different MCUs, a transmission path passing the least MCUs can be selected according to the connection situation between the MCUs. Therefore, delay caused by the forwarding and the transmission of the media stream is decreased, and at the same time, the number of the times of encoding and decoding of the media stream in each of the MCUs is decreased, and quality loss of the video and audio is reduced greatly. At the same time, the communications method for the MCU cascaded system, the implementation can be performed by software upgrading in existing MCU equipment without modifying the lines, thus having better overall extensibility, and being easier to implement.

It is obvious that, persons skilled in the art can make modifications to and transformations of the present invention without departing from the spirit and scope of the present invention. So, if the modifications to and the transformations of the present invention fall within the scope of the claims of the present invention and the equivalent technique thereof, the present invention is also intended to include these modifications and transformations.

The above is some exemplary embodiments of the present invention, but the protection scope of the present invention is not limited herein. Any change or replacement that can be easily figured out by persons skilled in the art within the technical scope disclosed by the present invention shall be covered by the protection scope of the present invention. Therefore, the protection scope of the present invention shall be the protection scope of the claims.

What is claimed is:

1. A Multipoint Control Unit (MCU) cascaded system, comprising a plurality of MCUs under management of a service management center, wherein the plurality of MCUs are in a mesh topology manner;
    each MCU in the plurality of MCUs is configured to receive information of a conference sent by the service management center;
    the MCU is further configured to, according to the information of the conference, schedule the conference, establish link list information about all MCUs that are to attend the conference, and call other MCUs that are to attend the conference to join the conference, wherein the link list information about the MCU comprises numbers of the other MCUs that are to attend the conference, a list of conference sites hung under the MCU, and a link path and a distance between the other MCUs and the MCU;
    the MCU is further configured to select MCUs connected to the MCU according to the link list information, send conference site information of the MCU to the MCUs connected to the MCU, request the MCUs connected to the MCU for the conference site information of the MCUs connected to the MCU, and after the conference site information of the MCUs connected to the MCU is received, combine the conference site information received from the MCUs and the conference site information of the MCU to form conference site information of the conference; and
    the MCU is further configured to select, according to the conference site information of the conference, a path to send video and audio data.

2. The MCU cascaded system according to claim 1, wherein the service management center is configured to determine and send the information of the conference, and the information of the conference comprises an MCU cascade situation of the conference;
    the MCU cascade situation of the conference comprises information of all of the MCUs that are to attend the conference and whether a networking mode is in a mesh topology manner, wherein the information of all of the MCUs that are to attend the conference comprises all of the MCUs that are to attend the conference.

3. The MCU cascaded system according to claim 2, wherein the information of all of the MCUs that are to attend the conference further comprises numbers of all of the MCUs that are to attend the conference;
    the MCU cascade situation of the conference further comprises a superior-subordinate relationship between an MCU and MCUs connected to the MCU, and
    a connection relationship between the MCU and the other MCUs that are to attend the conference.

4. The MCU cascaded system according to claim 1, wherein the selecting the path is performed according to one or more kinds of information selected from: a link distance of a transmission of the video and audio data, network quality, and network security.

5. A communications method for a Multipoint Control Unit (MCU) cascaded system, wherein the system comprising a plurality of MCUs under management of a service management center, the plurality of MCUs are in a mesh topology manner, and the method comprises:
    receiving information of a conference sent by a service management center;
    according to the information of the conference, scheduling the conference, establishing link list information about all MCUs that are to attend the conference, and calling other MCUs that are to attend the conference to join the conference, wherein the link list information about the MCU comprises numbers of the other MCUs that are to attend the conference, a list of conference sites hung under the MCU, and a link path and a distance between the other MCUs and the MCU;
    selecting, according to the link list information, MCUs connected to the MCU;
    sending conference site information of the MCU to the MCUs connected to the MCU;
    requesting the MCUs connected to the MCU for the conference site information of the MCUs connected to the MCU; and
    after the conference site information of the MCUs connected to the MCU is received, combining the conference site information received from the MCUs and the conference site information of the MCU to form conference site information of the conference; and
    selecting, according to the conference site information, a path to send video and audio data.

6. The communication method for a cascaded system according to claim 5, wherein
    the information of the conference comprises an MCU cascade situation of the conference;
    the MCU cascade situation of the conference comprises information of all of the MCUs that are to attend the conference and whether a networking mode is in a mesh topology manner; wherein the information of all of the MCUs that are to attend the conference comprises all of the MCUs that are to attend the conference.

7. The communications method for a cascaded system according to claim 6, wherein
the information of all of the MCUs that are to attend the conference further comprises numbers of all of the MCUs that are to attend the conference;
the MCU cascade situation of the conference further comprises a superior-subordinate relationship between an MCU and MCUs connected to the MCU, and
a connection relationship between the MCU and the other MCUs that are to attend the conference.

8. The communications method for a cascaded system according to claim 7, wherein the calling the other MCUs that are to attend the conference to join the conference comprises:
calling, according to the superior-subordinate relationship between the MCU and the MCUs connected to the MCU, subordinate MCUs connected to the MCU to join the conference.

9. The communications method for a cascaded system according to claim 6, wherein after the receiving the information of the conference sent by the service management center, the method further comprises negotiating, by the MCU, with the MCUs connected to the MCU to determine one or more kinds of information as follows:
the numbers of all of the MCUs that are to attend the conference;
the superior-subordinate relationship between the MCU and the MCUs connected to the MCU, and
the connection relationship between the MCU and the other MCUs that are to attend the conference.

10. The communications method for a cascaded system according to claim 9, wherein the calling the other MCUs that are to attend the conference to join the conference comprises:
calling, according to the superior-subordinate relationship between the MCU and the MCUs connected to the MCU, subordinate MCUs connected to the MCU to join the conference.

11. The communications method for an MCU cascaded system according to claim 5, wherein the selecting the path is performed according to one or more kinds of information selected from: a link distance of a transmission of the video and audio data, network quality, and network security.

12. A Multipoint Control Unit (MCU), located in an MCU cascaded system, comprising an establishment unit, a synchronization unit, and a sending unit, wherein a cascade manner between MCUs in the system is in a mesh topology manner;
the establishment unit is configured to, according to information of the conference sent by a service management center, schedule a conference, establish link list information about all MCUs that are to attend the conference, and call other MCUs that are to attend the conference to join the conference, wherein the link list information about the MCU comprises numbers of the other MCUs that are to attend the conference, a list of conference sites hung under the MCU, and a link path and a distance between the other MCUs and the MCU;
the synchronization unit is configured to select MCUs connected to the MCU according to the link list information, send conference site information of the MCU to the MCUs connected to the MCU, request the MCUs connected to the MCU for the conference site information of the MCUs connected to the MCU, and after the conference site information of the MCUs connected to the MCU is received, combine the conference site information received from the MCUs and the conference site information of the MCU to form conference site information of the conference; and
the sending unit is configured to select, according to the conference site information of the conference, a path to send video and audio data.

13. The MCU according to claim 12, wherein the information of the conference comprises an MCU cascade situation of the conference;
the MCU cascade situation of the conference comprises information of all of the MCUs that are to attend the conference and whether a networking mode is in a mesh topology manner; wherein the information of all of the MCUs that are to attend the conference comprises all of the MCUs that are to attend the conference.

14. The MCU according to claim 13, wherein the information of all of the MCUs that are to attend the conference further comprises numbers of all of the MCUs that are to attend the conference;
the MCU cascade situation of the conference further comprises a superior-subordinate relationship between an MCU and MCUs connected to the MCU, and
a connection relationship between the MCU and the other MCUs that are to attend the conference.

15. The MCU according to claim 13, wherein the MCU is further configured to determine one or more kinds of information as follows:
the numbers of all of the MCUs that are to attend the conference,
the superior-subordinate relationship between the MCU and the MCUs connected to the MCU, and
the connection relationship between the MCU and the other MCUs that are to attend the conference.

16. The MCU according to claim 12, wherein the selecting the path is performed according to one or more kinds of information selected from: a link distance of a transmission of the video and audio data, network quality, and network security.

\* \* \* \* \*